United States Patent
Alleshouse

(10) Patent No.: US 8,459,555 B2
(45) Date of Patent: *Jun. 11, 2013

(54) XML SYSTEM

(75) Inventor: Bruce N. Alleshouse, Wilmette, IL (US)

(73) Assignee: ZIH Corp., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,614

(22) Filed: May 6, 2011

(65) Prior Publication Data

US 2011/0303749 A1    Dec. 15, 2011

Related U.S. Application Data

(63) Continuation of application No. 11/561,084, filed on Nov. 17, 2006, now Pat. No. 7,959,082, which is a continuation of application No. 11/010,895, filed on Dec. 13, 2004, now Pat. No. 7,172,122, which is a continuation of application No. 10/601,213, filed on Jun. 20, 2003, now Pat. No. 6,908,034, which is a continuation-in-part of application No. 10/348,422, filed on Jan. 21, 2003, now Pat. No. 6,655,593, which is a continuation of application No. 10/197,014, filed on Jul. 17, 2002, now Pat. No. 6,540,142.

(60) Provisional application No. 60/345,389, filed on Jan. 4, 2002, provisional application No. 60/341,427, filed on Dec. 17, 2001.

(51) Int. Cl.
*G06K 7/10* (2006.01)
*G06F 17/00* (2006.01)

(52) U.S. Cl.
CPC . *G06K 7/10* (2013.01); *G06F 17/00* (2013.01)
USPC ...................... 235/462.01; 235/375

(58) Field of Classification Search
CPC .................................. G06K 7/10; G06F 17/00
USPC ..................... 235/432, 383, 375, 487, 462.01
See application file for complete search history.

(56) References Cited

U.S. PATENT DOCUMENTS

| | | | |
|---|---|---|---|
| 5,527,407 A | 6/1996 | Gartland et al. | |
| 5,860,068 A | 1/1999 | Cook | |

(Continued)

FOREIGN PATENT DOCUMENTS

| | | |
|---|---|---|
| CN | 1287922 A | 3/2001 |
| CN | 1409668 A | 4/2003 |

(Continued)

OTHER PUBLICATIONS

Anderegg, J.U.; "SVG and Image "Caching"—Page Fore-/Backgrounds—Transparency" FOP-DEV Mailing List Jan. 24, 2003, Downloaded at: http://mail-archives.apache.org/mod_mbox/xmlgraphics-fop-dev/200301.mbox/%3cLOEDKBFMB-BGFAPEJNBCOEEAACHAA.hansuli.anderegg@bluewin.ch%3e; Jul. 14, 2010; 3 sheets.

(Continued)

*Primary Examiner* — Thien M Le
(74) *Attorney, Agent, or Firm* — Alston & Bird LLP

(57) ABSTRACT

An XML system is configured to generate encoding information for an RFID device, based upon an extensible markup language (XML) input data stream. The XML system includes a computer system having a memory subsystem, a communication interface operatively coupled to a network, an XML processor configured to receive and process the XML input data stream, and an extensible stylesheet language transformation (XSLT) processor configured to obtain a stylesheet identified in the XML data stream or obtain the stylesheet from a repository. The XSLT processor transforms data in the XML input data stream into transformed XML data based upon the stylesheet obtained. Also included is an extensible stylesheet language formatting object (XSLFO) processor configured to format the transformed XML data into formatted XML data based upon XSLFO instructions contained in the stylesheet, and a rendering subsystem configured to receive the formatted XML data and generate encoding information for an RFID device.

21 Claims, 6 Drawing Sheets

U.S. PATENT DOCUMENTS

| | | | |
|---|---|---|---|
| 6,154,378 | A | 11/2000 | Peterson et al. |
| 6,226,675 | B1 | 5/2001 | Meltzer et al. |
| 6,246,326 | B1 | 6/2001 | Wiklof et al. |
| 6,289,501 | B1 | 9/2001 | Mutschler, III |
| 6,305,605 | B1 | 10/2001 | Goetz et al. |
| 6,449,620 | B1 | 9/2002 | Draper et al. |
| 6,457,883 | B1 | 10/2002 | Silverbrook et al. |
| 6,487,566 | B1 | 11/2002 | Sundaresan |
| 6,507,856 | B1 | 1/2003 | Chen et al. |
| 6,539,422 | B1 | 3/2003 | Hunt et al. |
| 6,540,142 | B1 | 4/2003 | Alleshouse |
| 6,568,596 | B1 | 5/2003 | Shaw |
| 6,600,418 | B2 | 7/2003 | Francis et al. |
| 6,655,593 | B2 | 12/2003 | Alleshouse |
| 6,764,009 | B2 | 7/2004 | Melick et al. |
| 6,793,127 | B2 | 9/2004 | Alsafadi et al. |
| 6,908,034 | B2 | 6/2005 | Alleshouse |
| 6,925,631 | B2 | 8/2005 | Golden |
| 7,025,268 | B2 | 4/2006 | Alleshouse |
| 7,126,716 | B1 | 10/2006 | Kaufman et al. |
| 7,172,122 | B2 | 2/2007 | Alleshouse |
| 7,267,279 | B2 | 9/2007 | Melick et al. |
| 7,339,690 | B2 | 3/2008 | Lenz et al. |
| 7,407,102 | B2 | 8/2008 | Alleshouse |
| 7,600,685 | B2 | 10/2009 | Alleshouse |
| 7,630,908 | B1 | 12/2009 | Amrien et al. |
| 7,733,509 | B2 * | 6/2010 | Buis et al. .............. 358/1.15 |
| 7,959,082 | B2 * | 6/2011 | Alleshouse ............. 235/462.01 |
| 7,959,083 | B2 * | 6/2011 | Alleshouse ............. 235/462.01 |
| 7,988,051 | B2 | 8/2011 | Alleshouse |
| 2002/0112224 | A1 | 8/2002 | Cox |
| 2003/0058469 | A1 * | 3/2003 | Buis et al. .............. 358/1.15 |
| 2003/0061947 | A1 | 4/2003 | Hohberger et al. |
| 2003/0090712 | A1 | 5/2003 | Lenz et al. |
| 2005/0246694 | A1 * | 11/2005 | Soderberg et al. ............ 717/143 |
| 2005/0262049 | A1 * | 11/2005 | Somppi ............................. 707/3 |
| 2006/0138227 | A1 | 6/2006 | Alleshouse |
| 2006/0249566 | A1 | 11/2006 | Alleshouse |

FOREIGN PATENT DOCUMENTS

| | | |
|---|---|---|
| GB | 2359645 | 8/2011 |
| JP | 2002-103746 | 4/2002 |
| JP | 2002-108850 A | 4/2002 |
| TW | 0578064 | 3/2004 |
| WO | WO 01/06345 A | 1/2001 |
| WO | WO 01/30581 A1 | 5/2001 |
| WO | WO 02/082363 A1 | 10/2002 |
| WO | WO 03/052658 A1 | 6/2003 |
| WO | WO 2005/122057 A1 | 12/2005 |

OTHER PUBLICATIONS

Böhm, Klemens; "On Extending the XML Engine with Query-Processing Capabilities"; Proceedings of the IEEE Advances in Digital Libraries; 2000; IEEE Computer Society Washington, DC, USA; May 2000; pp. 127-138.

Kay M., "XSLT Part 2—How Does XSLIT Transform XML?", Internet Citation, http://web.archive.org/web/20011124080629/http://tutorials.beginners.co.uk/read/id/143; Nov. 24, 2001 (retrieved on May 25, 2004).

Sandstrom, A: "Announce: FOP 0.16 Release"XSL-List Mailing List Jan. 2, 2001; Downloaded at: URL:http://xml.coverpages.org/fop16-Ann.html; Jul. 14, 2010; 2 sheets.

Application Development Trends Apr. 1999, XML The Last Silver Bullet, J. Vaughan (4 page magazine article).

Auto-ID Center Uses Physical Markup Language in Radio Frequency Identification (RFID) Tag Technology, Cover Pages, http://xml.coverpages.org/ni2001-ll -21-c.html, created Nov. 21, 2001.

Chicago Tribune, Dec. 4, 2000, New Computer Language to Streamline Business-to-Business e-commerce (1 page).

Infoworld, Sep. 4, 2000, www.infoworld.com, EDI-to-XML Conversions Getting. A Boost, Ephraim Schwartz (1 page magazine article).

International Business Machines Corporation, "A Process for Optimized Application of XSL Stylesheets for Use With Partially Static XML Data Streams", Research Disclosure, Mason Publications, whole document, Apr. 2000 , vol. 432, No. 179.

JetForm XFA—JetForm XML Forms Architecture XFA.ORG (17 page power point presentation), before May 6, 2010.

JetForm XML Forms Architecture XFA.COM, file://D:\JetForm%20XML%20Forms% 20Architecture%20SFA_Com.htm (10 page website article), before May 6, 2010.

2 pages entitled Toshiba TEC Corporation—Toshiba TEC introduces B-482 with the following invaluable network capability. (1999), before May 6, 2010.

1 page entitled Welcome—Toshiba TEC Corporation—Toshiba TEC Thermal Transfer Printer B-482: Vertual experienc (sic) (1999), before May 6, 2010.

Toshiba TEC Corporation Bar Code Systems Engineering Dept., Web Printer XML Function, Sep. 20, 2000 (7 page power point presentation).

X Marks The Spot, Apr. 1999; D.Andrews, website article http://www.idsystems.corn/reader/1999_04 infolink/xm110499.htm (3 page website article).

Search Report for European Patent Application No. 10 18 4234 dated Jan. 21, 2011.

Extended Search Report for European Patent Application No. 10 18 3493 completed Mar. 18, 2011.

International Search Report—International Application No. PCT/US02/36322, dated Dec. 19, 2002.

Extended Search Report for European Patent Application No. 10 18 9303, completed Jul. 12, 2011.

Schneider, B., "Dynamic Web Presentation with Java and XSLT"; [Online]; [Retrieved on Nov. 22, 2006]; Retrieved from the Internet: <URL:http://www.eveandersson.com/arsdigita/asj/xslt; XP002408527; Jun. 5, 2001; 8 pages.

Office Action from U.S. Appl. No. 13/157,973, mailed Jun. 7, 2012.

Office Action for European Patent Application No. 02789602, dated Aug. 8, 2012.

Office Action for European Patent Application No. 04752504, dated Aug. 8, 2012.

Office Action from U.S. Appl. No. 13/160,037 mailed Nov. 23, 2012.

* cited by examiner

XML SYSTEM

CROSS-REFERENCE TO RELATED APPLICATIONS

This application is a continuation of U.S. application Ser. No. 11/561,084, filed Nov. 17, 2006 now U.S. Pat. No. 7,959,082, entitled "XML System"; which is a continuation of U.S. application Ser. No. 11/010,895, filed Dec. 13, 2004, now U.S. Pat. No. 7,172,122, entitled "XML System"; which is a continuation of U.S. application Ser. No. 10/601,213, filed Jun. 20, 2003, now U.S. Pat. No. 6,908,034, entitled "XML System"; which is a continuation-in-part of U.S. application Ser. No. 10/348,422, filed Jan. 21, 2003, now U.S. Pat. No. 6,655,593, entitled "Native XML Printer"; which is a continuation of U.S. application Ser. No. 10/197,014, filed Jul. 17, 2002, now U.S. Pat. No. 6,540,142, entitled "Native XML Printer"; which claims priority from U.S. Provisional Application No. 60/345,389, filed Jan. 4, 2002, entitled "XML Printer Technology", and U.S. Provisional Application No. 60/341,427, filed Dec. 17, 2001, entitled "Bar Code Labeling Systems Having Machine Readable Standards", all of which are hereby incorporated herein in their entirety by reference.

STATEMENT REGARDING COPYRIGHT RIGHTS

A portion of this disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to a method and apparatus for printing media, such as tickets, tags, cards, barcode labels, sheet fed paper, continuous and fan-folded paper, plastic media, and for encoding RF (Radio Frequency) identification circuitry (RFID) that may be embedded in media, and more specifically to a native printer that prints such as printed media and/or encodes RFID devices based on an XML data stream.

BACKGROUND

Printer systems for printing barcodes and for transmitting data to a barcode printer are known. However, many such systems use proprietary methods of data encoding, and therefore such methods cannot be used interchangeably with other barcode printers. Also, known data encoding methods typically render the underlying data unreadable by humans. While this presents no impediment to the computer systems, it may be burdensome to humans attempting to review, debug or understand certain data appearing in the underlying barcode element names.

Barcode labeling is used extensively in many facets of commerce. In particular, packages or merchandise shipped from one destination to another are identified by the shipper by a specific barcode label. Conversely, merchandise received may also be identified and entered into the receiver's inventory system by use of the barcode label. Often, the receiver of merchandise may dictate the form and content of the barcode applied by the shipper. This is referred to as "compliance labeling." Of course, merchandise need not be shipped to avail itself of the benefits of barcode labeling. For example, inventory control systems make extensive use of barcode labeling to track and monitor various goods within a facility or between facilities.

Compliance labeling is typically used by buyers of merchandise having relatively large market power or purchasing power. Because of their economic power, they may be able to dictate the form and content of the barcode labels applied to products provided to them by their suppliers or vendors. Although this may be burdensome to the supplier, if the supplier desires to do business with the buyer, they must comply with their demands with respect to labeling. For example, large retailers, such as Wal-Mart, Inc., not only have the ability and purchasing power to require that suppliers meet their compliance labeling demands, but may also fine suppliers who fail to comply with the labeling requirements.

Further, such barcode labeling requirements may change at the whim of the entity demanding compliance. Accordingly, the supplier must implement the new labeling requirements and test the modified barcode to insure that it meets all specifications. This is relatively inefficient and time consuming. It is also prone to errors, which may translate into monetary fines.

A need exists to provide an open standard for defining barcode labeling information that is self-validating and which does not require significant software programming changes to implement a change in form or content of a barcode label. A need also exists for use of a format in which to provide data to a barcode printer where the data is understandable by a human reading the data. Additionally, a need exists for use of a format in which other data, such as RFID data, may be supplied to a device to effect encoding of the RFID data into embedded RFID circuits or other automatic identification devices.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Figure 1:
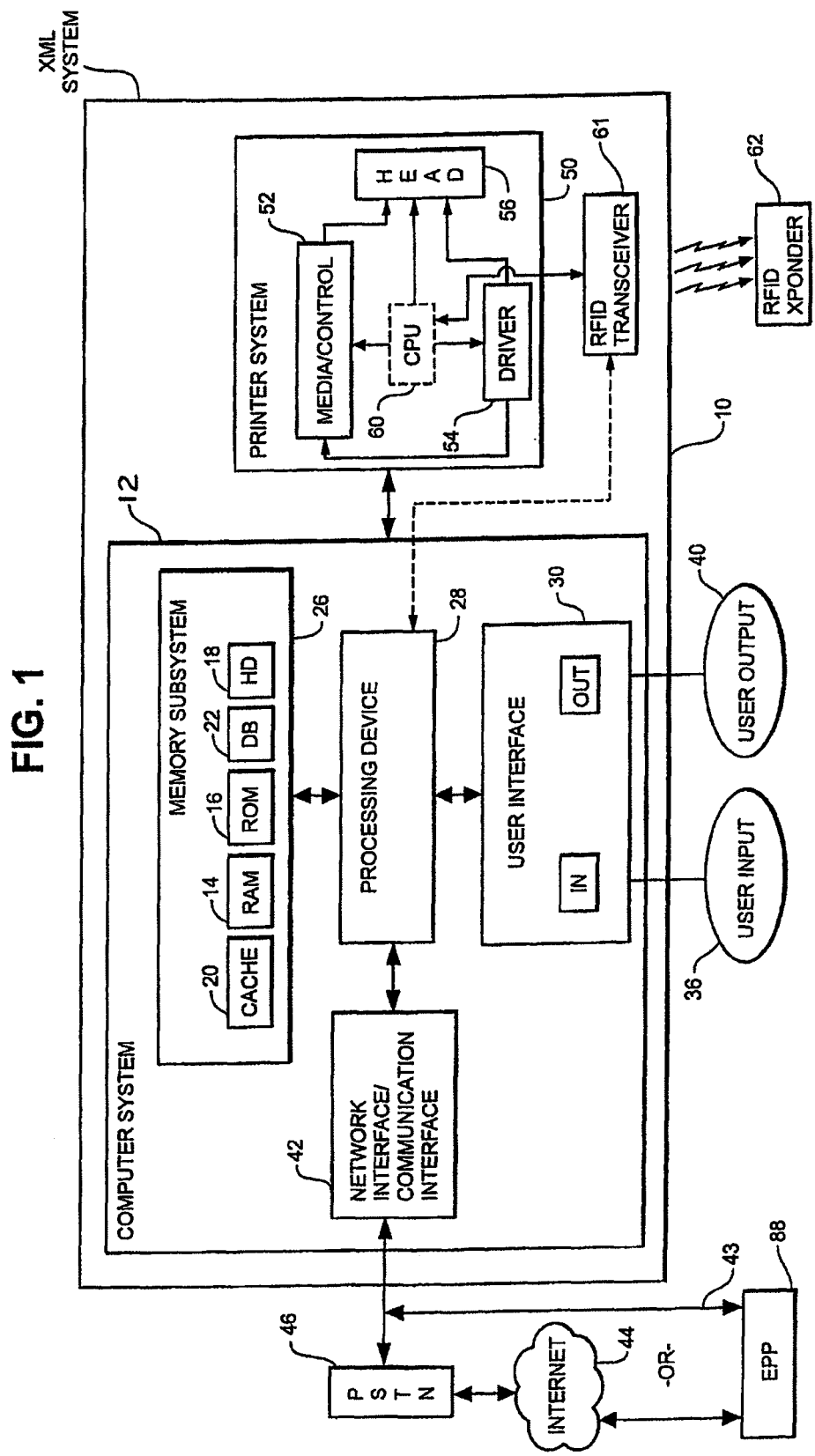
FIG. 1 is a high-level hardware block diagram of a specific embodiment of an XML system according to the present invention.

Referring now to FIG. 1, a specific embodiment of a high-level hardware block diagram of an XML system 10 is shown generally. The XML system 10 includes a computer or processing system 12, which includes various hardware components, such as RAM 14, ROM 16, hard disk storage 18, cache memory 20, database storage 22, and the like (also referred to as "memory subsystem" 26), as is known in the art. The computer system 12 may include any suitable processing device 28, such as a computer, microprocessor, RISC processor (reduced instruction set computer), CISC processor (complex instruction set computer), mainframe computer, work station, single-chip computer, distributed processor, server, controller, micro-controller, discrete logic computer and the like, as is known in the art. For example, the processing device 28 may be an Intel Pentium® microprocessor, x86 compatible microprocessor, or equivalent device.

The memory subsystem 26 may include any suitable storage components, such as RAM, EPROM (electrically programmable ROM), flash memory, dynamic memory, static memory, till-D (first-in first-out) memory, LIFO (last-in first-out) memory, circular memory, semiconductor memory, bubble memory, buffer memory, disk memory, optical memory, cache memory, and the like. Any suitable form of memory may be used whether, fixed storage on a magnetic medium, storage in a semiconductor device or remote storage accessible through a communication link.

A user interface 30 may be coupled to the computer system 12 and may include various input devices 36, such as switches selectable by the user and/or a keyboard. The user interface also may include suitable output devices 40, such as an LCD display, a CRT, various LED indicators and/or a speech output device, as is known in the art.

To communicate between the computer system 12 and external sources, a communication interface 42 may be operatively coupled to the computer system. The communication interface 42 may be, for example, a local area network, as an Ethernet network, intranet, or other suitable network 43. The communication interface 42 may also be connected to a public switched telephone network (PSTN) 46 or POTS (plain old telephone system), which may facilitate communication via the Internet 44. Dedicated and remote networks may also be employed. Any suitable commercially available communication device or network may be used, as is known in the art.

The computer system 12 may be further coupled to a printer system 50. The printer system 50 may include a media/paper control system 52, a printer driver 54 and a print head mechanism 56. Any suitable printer capable of printing barcode labels may be used, which may include various dot matrix, ink jet, laser and/or thermal printers. Of course, dot matrix printers are usually of lower quality and require closer monitoring of the label output. Preferably, the printer system 50 is a thermal transfer printer. Such suitable printers, for example, are available from Zebra Technologies Corporation of Vernon Hills, Ill., and may include the Model Xi series barcode printers (XiIII+, 90XiIII, 96XiIII, 140XiIII, 170XiIII, 220XiIII, etc.), the 2800 Series barcode printers, Model Z4M, Z6M, 105SL barcode printers, and others. Any suitable barcode label printer may be used.

Alternatively, the printer system 50 may include a "non-printing" mechanism to handle the programming of RFID (radio frequency identification) media, which may also receive printed labeling or other printed indicia on its surface. The term "printer system" is meant to include systems that also include RFID capability although the "RFID" may not be part of the term. Additionally, although the term "barcode labels" are used herein, this term is not limited to a paper label, and may include, for example, tickets, tags, cards, sheet fed paper, continuous and fanfold paper, plastic media, media embedded with RFID circuits, and other automatic identification devices. The present invention applies to any type of media.

Typically, such printers may include various motors, label cutters, ribbon handlers, sensors, and the like (not shown). Additionally, such printers may include various control inputs or sensors, such as a media sensor, print head temperature sensor, head open sensor, ribbon sensor, and the like (not shown), as is known in the art. The printer system 50 may include one or more additional processors 60, other than the processor 28 residing in the computer system 12. Alternatively, the processor 28 in the computer system 12, if sufficiently powerful, may control and handle the printer system 50 functions without the need for a separate processing device. Thus, all functions of the printer system 50 may be controlled by a computer or processor physically separate from the printer system.

The processor 60 of the printer system may be further operatively coupled to an RFID transceiver 61. The RFID transceiver 61 may be operatively coupled to the processor 60 or may be operatively coupled to the processing device 28 of the computer system 12, as shown by a dashed line in FIG. 1. It is not important to the scope of this invention where the RFID transceiver 61 resides or to which processing component it is coupled.

The RFID transceiver 61 is configured to communicate with an RFID transponder 62 and program the RFID transponder. RFID transponder 62 may be of the "chip" or "chipless" type, and one common form of such an RFID transponder, which is often used in "smart labels," includes an antenna and an RFID integrated circuit (not shown). Such RFID transponders 62 include both DC powered active transponders and battery-less passive transponders, and are available in a variety of form factors. The term "barcode printer" or "barcode system" is used interchangeably herein with the term "barcode/RFID system," "XML system" and the like, and such a system includes the capability to encode RFID data into an RFID transponder, even though the term "RFID" may not necessarily be part of the identifying text. The system 12 must have the capability to encode RFID data into an RFID transponder.

Greater detail concerning RFID transponders may be found in application Ser. No. 10/001,364, entitled Method And Apparatus For Associating On Demand Certain Selected Media And Value-Adding Elements, filed Oct. 25, 2001, and currently pending, which is owned by the assignee of this application. Application Ser. No. 10/001,364 is hereby incorporated by reference in its entirety.

Preferably, the computer system 12 and the printer system 50 are located in a common enclosure, but need not necessarily be constructed in this manner. For example, the computer system 12 may be housed in an enclosure separate and apart from the printer system 50.

Figure 2:
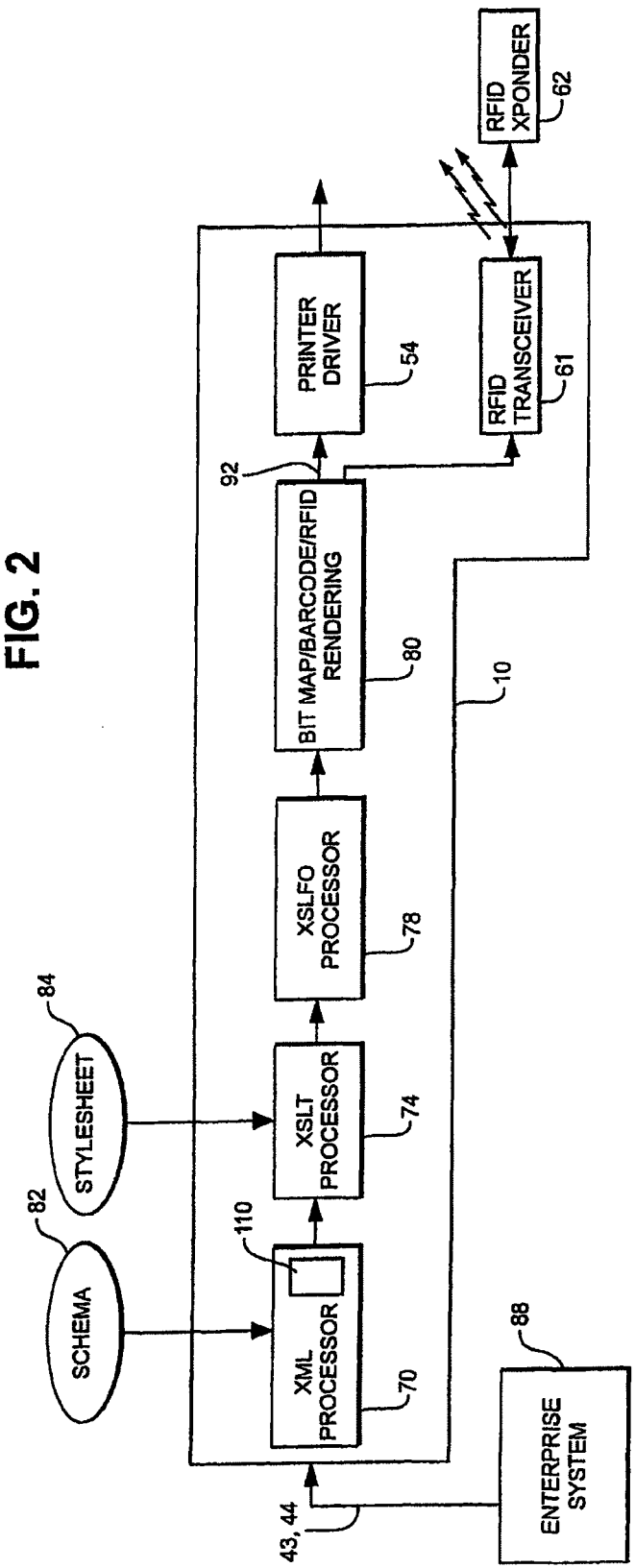
FIG. 2 is a high-level software block diagram of a specific embodiment of an XML system.
Figure 3:
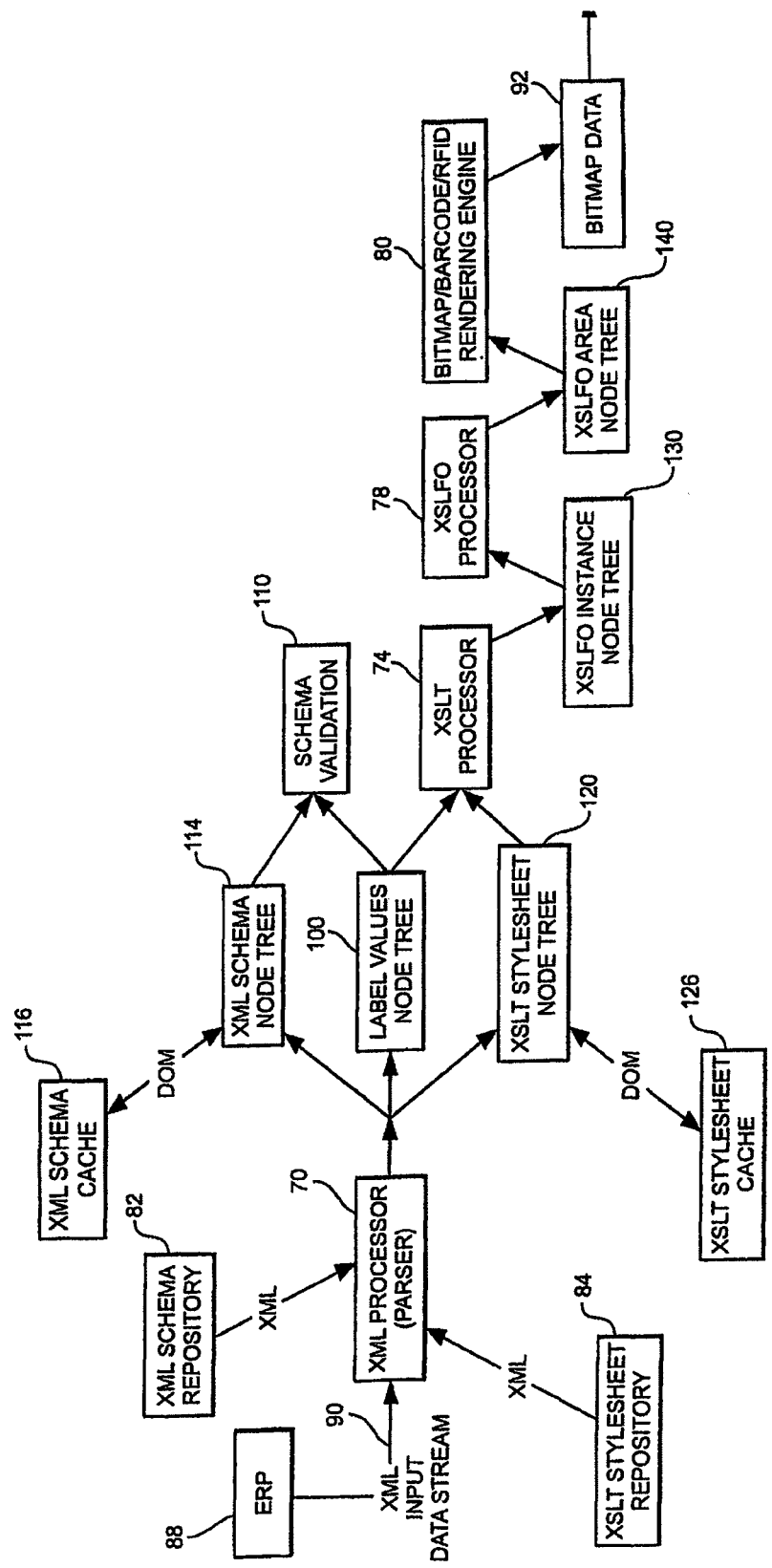
FIG. 3 is a combined high-level software block diagram and data flow diagram of a specific embodiment of an XML system.

Referring now to FIGS. 1-3, FIG. 2 illustrates a specific embodiment of a high-level software block diagram, while FIG. 3 illustrates a specific embodiment of a combined high-level software block diagram and data flow diagram. The software described below may be executed by the processor 28 of the computer system 12 of FIG. 1. Again, the processor 28 may perform functions common to both the computer system 12 and the printer system 50. There may be one or more processors, which may function in concert or which may function separately. It is not material to the scope of this invention whether the processing or processing functions are performed by or in the computer system or by or in the printer system.

The software blocks illustrated in FIGS. 2-3 include an XML (extensible mark-up language) processor 70 (also referred to as the "XML parser"), an XSLT (extensible stylesheet language transformation) processor 74, an XSLFO (extensible stylesheet language formatting object) processor 78, a bit map/barcode/RFID rendering engine 80, the RFID transceiver 61, and the printer driver 54 (FIG. 1). Of course, the RFD transceiver 61 may be used in conjunction with printed labels, or may be used separately. The function and basic structure of the XML system 10 is unaffected by the inclusion or non-inclusion of the RFD) transceiver.

Note that the printer driver 54 is an example of a component described above whose function may be performed by either the processing device in the computer system 12 or the processing device 60 (FIG. 1) in the printer system 50, depending upon the physical location of the associated processing device. Again, a single processing device, if sufficiently powerful, may handle all functions for the XML system 10.

An XML schema repository 82 (schema repository) may provide input to the XML processor 70 while an XSLT stylesheet repository 84 (stylesheet repository) may provide input to the XSLT processor 74. Also shown is an enterprise resource planning (ERP) system 88, which may be, for example, a warehouse management system that transmits an XML input data stream 90 to the XML processor 70. The ERP system 88 essentially initiates the request to print the barcode label or encode the RFID data into the RFID transponder 62, and provides the XML data that forms the bar code, RFID encoded data, and other variable label or element fields to be printed or encoded. Such variable label fields may include, for example, any or all of the human-readable text and/or characters printed on the label. Of course, any enterprise computer system may be used, and this invention is not limited to use with any specific type of enterprise computer system.

When referring to the XML data, two basic types shall be referred to herein, namely, the XML value data and the XML element name. The XML value data is the changeable data or the data that is desired to be printed on the barcode label or encoded into the RFID transponder, such as the data "1122 Green Street," which may be part of the XML value data corresponding to, for example, a shipping address. The XML element names are part of the XML language semantics where an arbitrary label or element name may be selected to represent the XML value data, the use of which is defined by the XML language. Typically, the element names appear between angled bracket ("<element name>").

As described above, known barcode label and other automatic identification systems often use proprietary software encoding schemes. Additionally, such schemes are often prone to errors, and the underlying value data is usually unreadable by a non-technical individual. In known systems, if an error exists in the underlying value data sent from the enterprise system, or if the data is missing or otherwise incorrect, the barcode system will print or encode what it is instructed to do, which of course, produces an error in the barcode label or RFID transponder, rendering it inaccurate or useless.

Moreover, when dealing with compliance labeling, known systems require non-trivial changes in the data encoding when the form or content of the label changes in accordance with the compliance label demands. Such changes in the form or content of the barcode or RFID transponder, again, are susceptible to errors, which in turn can lead to monetary fines by the entity demanding compliance. Business relationships may also be damaged by continued problems in the barcode labeling system, especially if such errors disrupt the business of the compliance demander.

The present XML system 10 utilizes an open format. In particular, the formatting requirements and the form of the barcode label or RFID transceiver are all defined in the XML language. Moreover, not only is XML well defined and available for all to use, but non-programmers can understand the data and commands in an XML data stream or file (or hard copy) with minimal training.

Various XML software blocks shown in FIGS. 2-3 are commercially available. Several different commercially available XML processors 70 may be used interchangeably or with little modification. For example, the following commercially available XML processors 70 may be used: "XML for C++" available from IBM Corporation, "MSXML3" available from Microsoft Corporation, "Oracle XML Developers Kit for C" available from Oracle Corporation, "Expat" available from That Open Source Software Center, Ltd., or "Xerces-C++" available from the Apache Software Foundation. However, any suitable XML processor may be used.

Similarly, several different commercially available XSLT processors 74 may be used interchangeably or with little modification. For example, the following XSLT processors 74 may be used: "iXSLT" available from Infoteria Corporation, "MSXML3" available from Microsoft Corporation, and "Libxslt" available from Gnome. However, any suitable XSLT processor may be used.

Again, several different commercially available XSLFO processors 78 may be used interchangeably or with little modification. For example, the following XSLFO processors 78 may be used: "XEP" available from RenderX Corporation, "XSL Formatter" available from Antenna House Corporation, and "FOP" available from the Apache Software Foundation. However, any suitable XSLFO processor may be used.

Still referring to FIGS. 1-3, the XML processor 70 receives the XML input data stream 90 from an external source 88. For example, the external source may be the ERP system 88, such as the warehouse management system. The XML processor 70 essentially parses and processes the XML input data stream 90 and generates a set of nodes, which may be in a "tree" structure, as is known in the art. Each of the software processing blocks shown in FIGS. 2-3 act on the nodes of the "tree" to perform their required function. The underlying value data contained in the XML input data stream 90 from the ERP system 88 is processed and entered into a "label values node tree," 100 which holds the data.

The following is a brief overview of the operation of the various software components. First, note that the XML input data stream 90 includes text that identifies the name and location of other required XML documents or files. One such document is referred to as "XML schema" or "schema." The schema is used to validate the XML input data stream, including the underlying value data. If validation is successful, a stylesheet is applied, as will be described below. The name and location of the stylesheet is also specified in the XML input data stream 90. Application of the stylesheet is handled by the XSLT processor 74, which under the direction of the stylesheet, may transform the underlying XML element names and/or underlying value data. Next, the data is processed by the XSLFO processor 78, which handles formatting and "layout" of the underlying value data, which may include, for example, formatting the underlying value data in accordance with, for example, font type, font size, color, and the like. Next, the underlying value data is processed by the bitmap/barcode/RFID rendering engine 80, which creates a bitmap 92 of the barcode label or the programming code sequence for the RFID transponder corresponding to the transformed and formatted data. The rendering engine 80 may utilize an "instream foreign object" residing in the stylesheet to direct creation of the bitmap. The bitmap 92 is then sent to the printer driver 54 (FIG. 1) for subsequent printing of the barcode label by the barcode printer or to the RFID transceiver 61 for encoding into the RFID transponder 62 (FIG. 1)

As described above, the schema functions to validate the entire input data stream 90, in particular, the underlying value data, where errors may be typically found. In practice, errors are often inadvertently introduced when changes are made to the form or content of the bar code label.

The name and location of the schema document is contained in the XML input data stream 90, which XML input data stream corresponds to the request to print and/or encode a barcode label. The XML processor 70 in conjunction with a schema validation module 110 validates the underlying value data. The use of schema is cost effective because it prevents errors and omissions with respect to the final output, namely, the bar code label, or "shipping label," or RFID tag or transponder.

If the XML input data stream 90 is rejected or flagged as having an error, an error message may be transmitted back to the source 88. This may flag or trigger human intervention to correct the error. For example, in this specific example, the source is the ERP system 88. In this way, the data is initially checked prior to processing to insure that it complies with all required label and barcode rules.

This may be particularly beneficial when dealing with compliance labeling. In known systems, the compliance demander would merely notify the supplier as to the changes in the compliance labeling requirements. If the supplier then makes an error in interpreting or implementing these changes or instructions, the labels produced or RFID transponders encoded and applied to products shipped to the compliance demander may have errors, which could jeopardize future business or cause monetary fines to be applied.

In the present invention, the compliance demander preferably makes the changes directly to the schema and/or the XSLT stylesheet. For example, if the physical layout of the label has been changed or if element names have been changed, the compliance demander will modify the XSLT style sheet. Similarly, if the underlying value data has been added or deleted or otherwise qualified (i.e., a new acceptable numerical range for a zip code), the compliance demander may modify the schema. In this way, the supplier need only modify the output of its ERP system 88 to ensure that it matches the modified XML input data stream 90. If only the physical layout of the label has changed, the supplier does not need to make any modifications at all.

For example, the compliance demander may now require that a nine digit zip code be used rather than the original five digit zip code. Accordingly, the compliance demander may modify the schema to require both a first and second zip code field, and the second field will also be limited to numerical digits within a certain range, perhaps 0000-9999. The compliance demander may also modify the stylesheet to accommodate that change. In response thereto, the supplier must insert the added zip code field in its ERP system so that it appears in the XML input data stream 90 sent to the XML system 10. If such modification of the XML input data stream 90 is not performed correctly, the schema will cause an error to be reported back to the ERP system 88, and the label will not be printed or the RFID transponder will not be encoded.

Thus, the supplier need only access the modified schema and/or stylesheet from the repository 82, 84, which is automatically applied to the underlying value data when received. Essentially, minor changes, and significantly, major changes, to the form and content of the barcode label or RFID transponder are transparent to the supplier, and such changes to the content of the barcode label or RFID transponder are validated in accordance with the schema. Accordingly, the supplier need not incur costs to change the form or content of the barcode label or RFID transponder dictated by the compliance demander, and cannot make any errors in implementing such changes. If there are any errors, such errors would have been inadvertently made by the compliance demander, who could not then blame the supplier.

The schema documents are preferably obtained from the XML schema repository 82. In one specific embodiment, the schema repository 82 may be external to the XML system 10 and the computer system 12, and may be accessed via the network, the Internet, or via any suitable network 43, 44 to which the computer system is coupled. The schema repository 82 may contain a plurality of schema documents. Thus, the XML input data streams 90 representing the various requests to create a barcode label or RFID transponder may each specify the name and location of the corresponding schema in the repository 82. When the request is received by the XML processor 70, the corresponding schema may be retrieved from the schema repository 82.

In another embodiment, the schema obtained from the schema repository 82 via the network 42, 43 may be kept locally, and thus may temporarily reside in the memory subsystem 26 (FIG. 1), such as the hard disk 18 or database 22. In this way, if the same schema is used for multiple XML input data streams 90 or for subsequent barcode label requests, the XML processor 70 need not retrieve the same schema externally via the network 42, 44, but rather, may retrieve that schema from the memory subsystem 26, which may be more efficient. According to this embodiment, the compliance demander may change or modify the schema in the external repository 82 at only certain times. For example, the compliance demander may change the stylesheet only at 1:00 AM each day. Thus, the supplier need only update the schema from the repository 82 into the memory subsystem 26 only once per day, for example, after the compliance demander has performed the schema update. The supplier would then know that the schema saved temporarily in the memory subsystem 26 is the most recent schema document, at least up until the time that the updating is scheduled to occur.

Regardless of the location from where the schema is obtained, the schema validation module 110 performs the checking and validation of the underlying data. Although the schema validation module 110 is shown as a separate block from the XML processor 70 in FIG. 2, it is shown in this location for purposes of illustration only so that it may be shown on the drawing adjacent to the label values node tree 100, which is the data upon which it acts. However, the schema validation module 110 may be part of and integrated into the XML processor 70, or it may be a separate and apart therefrom.

Of course, the schema is also an XML document, and thus it is also processed by the XML processor 70. Accordingly, the result of the processing of the schema is the XML schema node tree 114 shown in FIG. 3, which is the "memory representation" or working model of the schema that was processed. The XML schema node tree 114 may be in the form of a "document object model" (DOM), as is known in the art.

Further, the XML schema node tree 114 may reside in cache memory for efficiency, as shown in an XML schema cache 116. The schema validation module 110 and/or the XML processor 70 operate on the data in the XML schema node tree 114 to perform its function of validating the underlying value data in accordance with the schema document.

As described above, if an error exists in the XML input data stream 90, as determined by application of the schema, an error message may be generated. If the XML input data stream 90 is validated, the data remains essentially "untouched." The data in the label value node tree 100 is then processed by the XSLT processor 74 using the XSLT stylesheets.

Alternatively, validation of the underlying value date may be performed according to Document Type Definition (DTD) format, rather than use of schema. Use of DTD is specified in detail in various XML specifications, and is known in the art.

The stylesheet documents are preferably obtained from the XSLT stylesheet repository 84. In one specific embodiment, the stylesheet repository 84 may be external to the XML system 10 and the computer system 12, and may be accessed via the network, the Internet, or via any suitable network 43, 44 to which the computer system is coupled. The stylesheet repository 84 may contain a plurality of stylesheets. Thus, XML input data streams 90 representing the various requests to create a barcode label or encode an RFID transponder may each specify the name and location of the corresponding stylesheet in the repository 84. When the request is received by the XML processor 70, the corresponding stylesheet may be retrieved from the stylesheet repository 84.

In another embodiment, the stylesheet obtained from the stylesheet repository 84 via the network 43, 44 may be kept locally, and thus may temporarily reside in the memory subsystem 26 (FIG. 1), such as the hard disk 18 or database 22. In this way, if the same stylesheet is used for multiple XML input data streams 90 or for subsequent barcode label or RFID transponder requests, the XML processor 70 need not retrieve the same stylesheet externally via the network 43, 44, but rather, may retrieve that stylesheet from the memory subsystem 26, which may be more efficient.

According to this embodiment, the compliance demander may change or modify the stylesheet in the external stylesheet repository 84 at only certain times. For example, the compliance demander may change the stylesheet only at 1:00 AM each day. Thus, the supplier need only update the stylesheet from the stylesheet repository 84 into the memory subsystem 26 only once per day, for example, after the compliance demander has performed the stylesheet update. The supplier would then know that the stylesheet saved temporarily in the memory subsystem 26 is the most recent stylesheet, at least up until the time that the updating is scheduled to occur.

Of course, the stylesheet is also an XML document, and thus it is also processed by the XML processor 70. Accordingly, the result of the processing of the stylesheet is the XSLT stylesheet node tree 120 shown in FIG. 3, which is the "memory representation" or working model of the stylesheet that was processed. The XSLT stylesheet node tree 120 may be in the form of a "document object model" (DOM), as is known in the art. Further, the XSLT stylesheet node tree 120 may reside in cache memory for efficiency, as shown in an XSLT stylesheet cache 126. The XSLT processor 74 operates on the data in the XSLT stylesheet node tree 120 to perform its function of transforming the underlying value data or underlying element names in accordance with the stylesheet.

Note that although the XSLT style sheet is shown as an input to the XML processor 70 in FIG. 3, the XSLT processor 74 processes the stylesheet. It is initially provided to the XML processor 70 because all XML documents are first processed and placed into the appropriate data structure for subsequent processing.

The XSLT processor 74 may modify, reposition, and rearrange the underlying value data or may add to the underlying value data or delete some of the underlying value data. For example, under direction of the stylesheet, the underlying value data may be rearranged into table format or into columns. In particular, the stylesheet may add XSLFO formatting elements and attributes.

After the underlying value data in the label value node tree 100 has been processed in accordance with the corresponding stylesheet, an XSLFO instance node tree 130 is produced. Again, the XSLFO instance node tree 130 may be in the form of a document object module, as is known in the art. The XSLFO instance node tree 130 contains XSLFO commands (layout instructions) that directs the XSLFO processor 78 with respect to formatting and layout. The XSLFO processor 78 then interprets the XSLFO commands and applies such commands to the underlying value data so as to properly format and layout the underlying value data. The XSLFO processor 78 produces the XSLFO area node tree 130, which represents the final output of formatting before rendering.

Turning now to FIG. 3 and a code segment shown immediately below entitled "code segment 1 for an XML input data stream," the code segment 1 illustrates an XML input data stream 90 in hard copy, which may, for example, be sent to the XML system 10 by the ERP or warehouse management system 88. Line numbering has been inserted for purposes of illustration only and is not part of the code.

Code Segment 1 For An XML Input Steam

```
<?xml version="1.0" encoding="UTF-8"?>
<?xml-stylesheet type="text/xsl"
    href="D:\Projects\XML\Native\Docs\ShipLabels.xsl"?>
<labels
    xmlns:xsi="http://www.w3.org/2001/XMLSchema-instance"
    xsi:noNamespaceSchemaLocation=
        "D:\Projects\XML\Native\Docs\ShipLabels.xsd">
    <label>
        <name>Albert Einstein</name>
        <address>1234 Relative Way</address>
        <city>Princeton</city>
        <state>NJ</state>
        <zip>08540</zip>
    </label>
    <label>
        <name>Steven Hawking</name>
        <address>5678 Black Hole Drive</address>
        <city>Los Angeles</city>
        <state>CA</state>
        <zip>90007</zip>
    </label>
    <label>
        <name>Richard Feynman</name>
        <address>90 Quantum Circle</address>
        <city>New York</city>
        <state>NY</state>
        <zip>10044</zip>
    </label>
</labels>
```

The XML input data stream identifies the schema document as "ShipLabels.xsd," and that schema document may be found, in this specific example, in a directory called "D:/Projects/XML/Native/Docs," as shown at line 7 in code segment 1. Further, the XML input data stream identifies the stylesheet document as "ShipLabels.xsl," and that stylesheet document may also be found in a directory called "D:/Projects/XML/Native/Docs," as shown at line 3 of the code segment 1. Of course, the schema document and the stylesheet document may be located anywhere, for example, as identified by an Internet address.

This specific example shows the underlying value data and element names for three shipping labels to be printed. Each shipping label contains an XML element name defined between angular brackets as follows: <name>, <address>, <city>, <state> and <zip>. The value of the first element name, <name>, is "Albert Einstein," the value of the second element name, <address>, is "1234 Relative Way," the value of the third element name, <city>, is "Princeton," the value of the forth element name, <state>, is "NJ" and the value of the fifth element name, <zip>, is "08540." This is the underlying value data.

Now turning to FIG. 3, code segment 1, and a code segment shown immediately below entitled "code segment 2 for XML schema," the code segment 2 illustrates a specific example of an XML document in the form of the XML schema document specified in the XLV input data stream of code segment 1. Line numbering has been inserted for purposes of illustration only and is not part of the code.

---

Code Segment 2 For XML Schema

```
<?xml version="1.0" encoding="UTF-8"?>
<xs:schema
        xmlns:xs="http://www.w3.org/2001/XMLSchema"
        elementFormDefault="qualified">
    <xs:element name="address" type="xs:string"/>
    <xs:element name="city" type="xs:string"/>
    <xs:element name="label">
        <xs:complexType>
            <xs:sequence>
                <xs:element ref="name"/>
                <xs:element ref="address"/>
                <xs:element ref="city"/>
                <xs:element ref="state"/>
                <xs:element ref="zip"/>
            </xs:sequence>
        </xs:complexType>
    </xs:element>
    <xs:element name="labels">
        <xs:complexType>
            <xs:sequence>
                <xs:element ref="label" maxOccurs="unbounded"/>
            </xs:sequence>
        </xs:complexType>
    </xs:element>
    <xs:element name="name" type="xs:string"/>
    <xs:element name="state">
        <xs:simpleType>
            <xs:restriction base="xs:string">
                <xs:enumeration value="CA"/>
                <xs:enumeration value="NJ"/>
                <xs:enumeration value="NY"/>
            </xs:restriction>
        </xs:simpleType>
    </xs:element>
    <xs:element name="zip">
        <xs:simpleType>
            <xs:restriction base="xs:int">
                <xs:minInclusive value="00000"/>
                <xs:maxInclusive value="99999"/>
            </xs:restriction>
        </xs:simpleType>
    </xs:element>
</xs:schema>
```

---

As mentioned above, the schema is used to validate the underlying value data. This entails checking to determine that all required data is present, that no extraneous data is present, that the data present is within the specified ranges, and the like. Any suitable validation scheme may be specified in the schema, depending upon the application. The XML language is robust and code may be written to handle a vast multitude of requirements.

For example, the schema document shown in code segment 2 above specifies that the underlying value data corresponding to the element name, <address>, must be a string, as defined in the XML Schema specification, as shown by line 5 in the code segment 2. The schema document also specifies that the underlying value data corresponding to the element names of <name>, <address>, <city>, <state>, and <zip> must also be present in the sequence indicated, as shown by lines 9-15 in the code segment 2. Further, this specific schema document shown in the code segment 2 specifies that the underlying value data corresponding to the element name, <state>, must be one of three states, namely, "CA," "NJ," or "NY." Of course, this is only an abbreviated example, and not all states have been included for purposes of illustration only. The schema document shown in code segment 2 also specifies that the underlying value data corresponding to the element name, <zip>, must be in the range from 00000 to 99999. If any of the above-mentioned schema criteria are not met by the data in the XML input data stream, the schema validation module 110 will reject it, and will preferably return an error message back to the source 88.

Now turning to FIG. 3, code segments 1-2, and a code segment shown immediately below entitled "code segment 3 for an XSLT stylesheet," the code segment 3 shows a specific example of an XML document in the form of the XSLT stylesheet document specified in the XML input data stream of the code segment 1. Line numbering has been inserted for purposes of illustration only and is not part of the code.

---

Code Segment 3 For An XSLT Stylesheet

```
<?xml version="1.0" encoding="UTF-8" ?>
<xsl:transform version="1.0"
        xmlns:xsl="http://www.w3.org/1999/XSL/Transform"
        xmlns:fo="http://www.w3.org/1999/XSL/Format"
        xmlns:bo="http://www.zebra.com/2002/XSL/Barcode">
<xsl:output method="xml" version="1.0" indent="yes" />
    <xsl:template match="labels">
        <fo:root>
            <fo:layout-master-set>
                <fo:simple-page-master master-name="all-labels">
                    <fo:region-body margin="1in" />
                </fo:simple-page-master>
            </fo:layout-master-set>
            <fo:page-sequence master-name="all-labels">
                <fo:flow flow-name="xsl-region-body" font="12pt Times">
                    <xsl:apply-templates />
                </fo:flow>
            </fo:page-sequence>
        </fo:root>
    </xsl:template>
    <xsl:template match="label">
        <fo:block break-after="page">
            <xsl:apply-templates select="name" />
            <xsl:apply-templates select="address" />
            <fo:block font="bold 14pt Times" text-align="left">
                <xsl:apply-templates select="city" />
                <xsl:apply-templates select="state" />
            </fo:block>
            <xsl:apply-templates select="zip" />
            <fo:block>
                <fo:instream-foreign-object>
                    <bo:barcode>
                        <bo:postnet interpretation-line="none">
                            <xsl:value-of select="zip" />
                        </bo:postnet>
                    </bo:barcode>
```

Code Segment 3 For An XSLT Stylesheet

```
              </fo:instream-foreign-object>
            </fo:block>
          </fo:block>
        </xsl:template>
        <xsl:template match="name">
          <fo:block font="bold 14pt Times" text-align="left">
            <xsl:value-of select="." />
          </fo:block>
        </xsl:template>
        <xsl:template match="address">
          <fo:block font="bold 14pt Times" text-align="left">
            <xsl:value-of select="." />
          </fo:block>
        </xsl:template>
        <xsl:template match="city">
          <xsl:value-of select="." />
        </xsl:template>
        <xsl:template match="state">
          <xsl:text>,</xsl:text>
          <xsl:value-of select="." />
        </xsl:template>
        <xsl:template match="zip">
          <fo:block font="bold 14pt Times" text-align="left">
            <xsl:value-of select="." />
          </fo:block>
        </xsl:template>
</xsl:transform>
```

As mentioned above, the stylesheet is used to transform the data. In this specific example, the stylesheet of the code segment 3 defines two types of namespace, namely, a "bo" type object, which is selected to be a "barcode-type object," and an "fo" type object, which is selected to be a formatting object, which was described above with respect to the XSLFO processor 78. This permits differentiation between the different objects, as is known in the art. The stylesheet may cause some data to be transformed or even added. For example, the underlying value data from the XML input data stream of the code segment 1, namely "Einstein, "1234 Relative Way," and the like, is inserted, as indicated by lines 40-62.

This stylesheet also causes a variety of "fo" type elements to be generated, which are designated as formatting elements or XSLFO objects. The XSLFO objects contain layout type commands that the XSLFO processor 78 "understands" and processes. Note that all lines of code having a prefix of "fo" are not interpreted by the XSLT processor 74, but rather, are passed on to the XSLFO processor 78.

For example, line 21 of the code segment 3 shows <xsl:template match="label"> followed by <fo:block break-after="page"> on line 22. This is interpreted by the XSLFO processor 78 to put a "page break" between the three shipping labels specified in the code segment 1. Essentially a new shipping label is created due to the page break, with each new shipping label containing the underlying value data specified in the code segment 1.

Further, this specific stylesheet specifies that an "instream foreign object" is inserted, as shown at line 31. Line 31 is shown as <fo:instream-foreign-object> in conjunction with lines 31-37, which define the instream foreign object. Note that the instream foreign object is not processed by either the XSLT processor 74 or the XSLFO processor 78. Rather, the instream foreign object is passed to and is processed by the bitmap/barcode/RFID rendering engine 80. For example, lines 32-36 of the code segment 3 cause a <bo:barcode> element to be inserted that contains the definition of a "postnet" barcode element, which element will later be processed by the bitmap/barcode/RFID rendering engine 80. At line 34, the XSLT processor 74 causes the zip code from the XML input data stream to be inserted as the text of the <bo:postnet> element. Alternatively, although not shown in the code, an RFID type instream foreign object may define the encoding for programming an RFID transponder.

Now turning to FIG. 3, code segments 1-3, and a code segment shown immediately below entitled "code segment 4 for an XSLT instance node tree representation," the code segment 4 shows a specific example of a representation of an XSLFO instance node tree 130 output produced by the XSLT processor 74 in conjunction with the stylesheet of code segment 3, which output is a representation of the XSLFO instance node tree provided to the XSLFO processor 78. Line numbering has been inserted for purposes of illustration only and is not part of the code.

Code Segment 4 For An XSLFO Instance Node Tree Representation

```
<?xml version="1.0" encoding="UTF-16" ?>
  <fo:root xmlns:fo="http://www.w3.org/1999/XSL/Format"
    xmlns:bo="http://www.zebra.com/2002/XSL/Barcode">
    <fo:layout-master-set>
      <fo:simple-page-master master-name="all-labels">
        <fo:region-body margin="1in" />
      </fo:simple-page-master>
    </fo:layout-master-set>
    <fo:page-sequence master-name="all-labels">
      <fo:flow flow-name="xsl-region-body" font="12pt Times">
        <fo:block break-after="page">
          <fo:block font="bold 14pt Times" text-
            align="left">Albert Einstein</fo:block>
          <fo:block font="bold 14pt Times" text-align="left">1234
              Relative Way</fo:block>
          <fo:block font="bold 14pt Times" text-
            align="left">Princeton, NJ</fo:block>
          <fo:block font="bold 14pt Times" text-
            align="left">08540</fo:block>
          <fo:block>
            <fo:instream-foreign-object>
              <bo:barcode>
                <bo:postnet interpretation-
                    line="none">08540</bo:postnet>
              </bo:barcode>
            </fo:instream-foreign-object>
          </fo:block>
        </fo:block>
        <fo:block break-after="page">
          <fo:block font="bold 14pt Times" text-align="left">Steven
            Hawking</fo:block>
          <fo:block font="bold 14pt Times" text-align="left">5678
            Black Hole Drive</fo:block>
          <fo:block font="bold 14pt Times" text-align="left">Los
              Angeles, CA</fo:block>
          <fo:block font="bold 14pt Times" text-
            align="left">90007</fo:block>
          fo:block>
            <fo:instream-foreign-object>
              <bo:barcode>
                <bo:postnet interpretation-
                    line="none">90007</bo:postnet>
              </bo:barcode>
            </fo:instream-foreign-object>
          </fo:block>
        </fo:block>
        <fo:block break-after="page">
          <fo:block font="bold 14pt Times" text-
            align="left">Richard Feynman</fo:block>
          <fo:block font="bold 14pt Times" text-align="left">90
            Quantum Circle</fo:block>
          <fo:block font="bold 14pt Times" text-align="left">New
            York, NY</fo:block>
          <fo:block font="bold 14pt Times" text-
              align="left">10044</fo:block>
```

Code Segment 4 For An XSLFO Instance Node Tree Representation

```
        <fo:block>
            <fo:instream-foreign-object>
                <bo:barcode>
                    <bo:postnet interpretation-
                            line="none">10044</bo:postnet>
                </bo:barcode>
            </fo:instream-foreign-object>
        </fo:block>
      </fo:block>
    </fo:flow>
  </fo:page-sequence>
</fo:root>
```

Two main portions of code segment 4 above are briefly described, namely, one portion beginning at line 4 with the code <fo:layout-master-set> and a second portion beginning at line 9 with the code <fo:page-sequence master-name="all-labels>. This portion of the code essentially defines what a barcode label will "look like" or how it will be "laid-out" and how the underlying value data will appear in that lay-out.

With respect to formatting the underlying value data shown in code segment 1, for example, the font attribute of "bold 14 pt Times" and text-align="left" shown in lines 12-13 will be applied to the underlying value data of "Albert Einstein" so that when the barcode label is printed, the name of "Albert Einstein" will be printed in 14 point Times font, and it will be aligned with the left margin of the barcode label. As is known in the art, may different kinds of formatting instructions may be specified, which will be interpreted by the XSLFO processor 78.

Further, this specific example of the representation of the XSLFO instance node tree 130 contains an instream foreign object, as shown at lines 21-26 of the code segment 4, which instream foreign object may not processed by the XSLFO processor 78. Rather, the instream foreign object may be passed to the bitmap/barcode/RFID rendering engine 80 for processing. Note that at this point in the processing, the XSLFO processor 78 does not "know" how to print a barcode label or encode an RFID transponder because barcode element types and RFID transponder element types are not included in the XSLFO specification. Rather, only the text information, such as the underlying value data, namely, "Einstein," "1234 Relative Way," and the like, as shown in code segments 1-2, could be printed on the barcode label as text. With respect to labels, no actual barcode symbol would appear because the XSLFO processor 78 does not "know" how to produce a barcode symbol. The RFID transponder would not be encoded because the XSLFO processor 78 does not "know" how to encode a transponder.

The result of processing by the XSLFO processor 78 is an XSLFO area node tree 140. Note that the instream foreign object shown in the code segment 4 is not processed by the XSLFO processor 78, but rather, is passed to the barcode/bitmap/RFID rendering engine 80 in one or more nodes of the XSLFO area node tree 140. The instream foreign object element is referred to as <bo:barcode> and is shown at lines 21-26 of the code segment 4. The barcode/bitmap/RFID rendering engine 80 receives the <bo:barcode> element and processes the code contained in that block. For example, the rendering engine 80 interprets lines 23-24, namely, <bo:postnet interpretation-line="none">08540<bo:postnet> as defining this particular node as being a "postnet" barcode type of element. Many different "types" of barcode symbols may be defined, as is defined by corresponding industry standards, discussed below.

Alternatively, if the instream foreign object element relates to RFID encoding, the rendering engine 80 would interpret the instream foreign object according to specific standards governing the programming and encoding of the RFID transponder 62 (FIG. 2) by the RFID transceiver 61 (FIG. 1). Like the elements and attributes of the XML data that specify how a barcode is to be printed, such elements and attributes can also specify the text and characteristics to be programmed into an RFID tag, such as the RFID transponder 62. Essentially, the rendering in accordance with the RFID-type instream foreign object governs the operation of the RFID transceiver 61 (FIG. 1). As such, radio frequency signals are transmitted between the RFID transceiver and the RFID transponder to effect programming of the RPM transponder.

The operation of the RFID transceiver may be according to international standards such as ISO/IEC or according to proprietary specifications from vendors such as Texas Instruments (Tag-it) or Phillips (I•Code). For example, operation may be governed by the International Organization for Standardization (ISO) specification 15693 for vicinity cards, or by ISO specification 14443 for proximity cards. ISO specification 15693 describes the physical characteristics, the radio frequency power and signal interface, and the anticollision and transmission protocol. The transmission protocol specification includes' the requests and responses to read, write, and lock the transponder. Note that the ISO specification 15693 is a preferable applicable standard when RFID label tags are involved.

The underlying value data to be printed as a barcode symbol is the numerical data "08540," as shown in line 24 of code segment 4, which underlying value data is the zip code associated with Albert Einstein's address shown in the code segment 1. In this specific example, only the zip code is transformed into the barcode symbol. Of course, any and all information may be transformed into a barcode symbol, depending upon the application. Also, in this specific example, the instream foreign objects shown in the code segment 4 only relate to the three zip codes shown in the code segment 1. No other underlying value data is transformed into the barcode symbol in this example.

Also note that the XML system 10 need not necessarily contain the XSLT processor 74. In an alternate embodiment, the XSLT processor 74 or the equivalent thereof may be remotely located from the XML system 10 and may be configured to transform XML data in the XML input stream and provide the transformed data to the XML system. Accordingly, the XML system 10 may receive and process the transformed XML data into formatted XML data. Remote or "separate" processing equivalent to the processing typically handled by the XSLT processor may be based upon XSLFO instructions contained in stylesheets, which also need not reside in or be directly accessible to the XML system 10.

Figure 4:
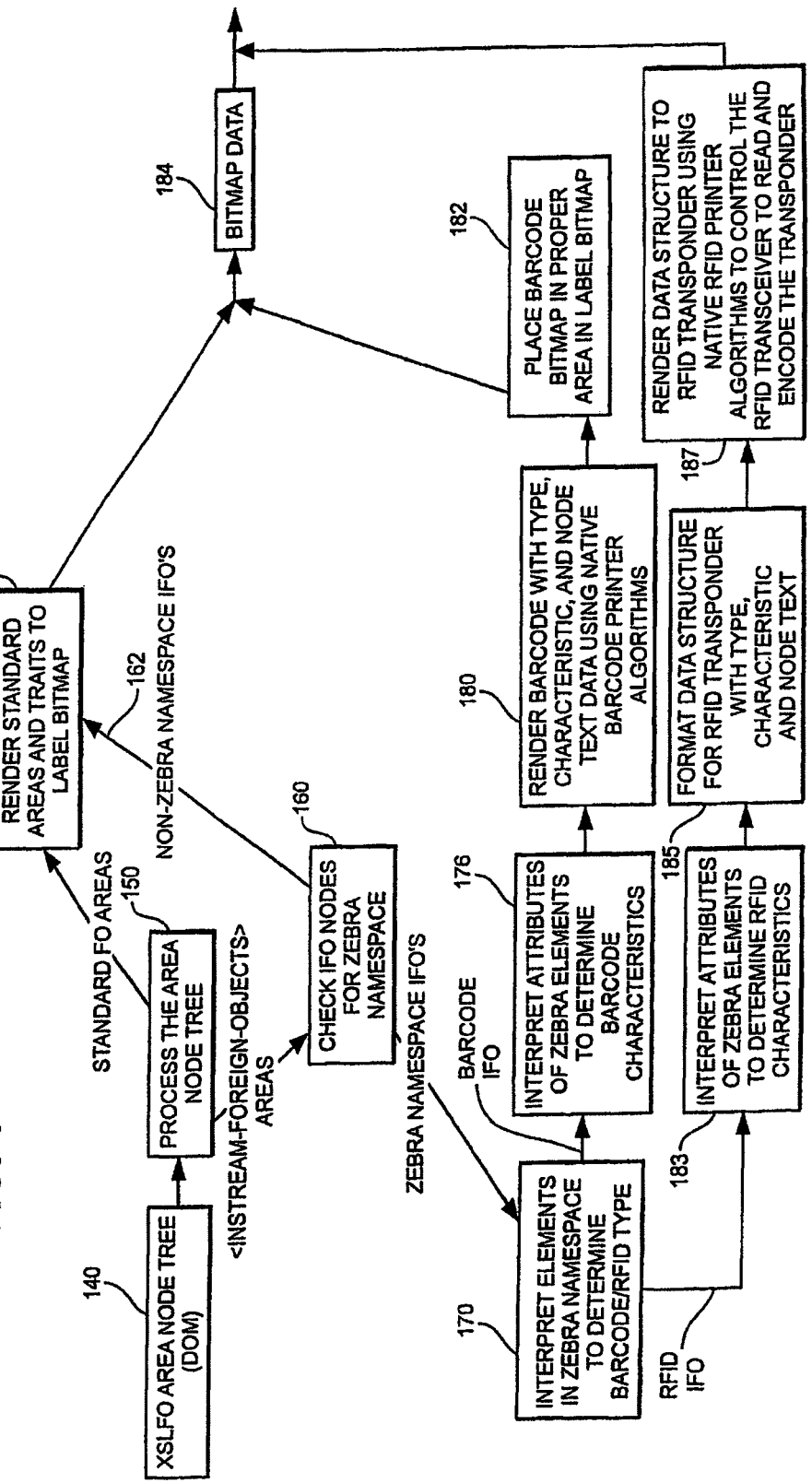
FIG. 4 is a high-level software block diagram of a specific embodiment of a bitmap/barcode and/or radio frequency identification (RFID) rendering engine.

Turning now to FIGS. 2-4 in conjunction with the code segment 4, additional detail concerning the barcode/bitmap/RFID rendering engine 80 and the processing of the instream foreign objects will now be set forth. As described above, the rendering engine 80 processes each node of the XSLFO area node tree 140 generated by the XSLFO processor 78. As is known in the art, the XSLFO area node tree 140 is represented in memory as a document object model. Accordingly, multiple nodes may exist. For example, one node may contain the instream foreign object, another node may contain associated element names, another node may contain associated text data, another node may contain associated attributes, and the like.

As shown in block 150 in FIG. 4, the nodes of the XSLFO area node tree 140 are processed. In particular, the rendering engine 80 "knows" how to render or produce the actual barcode symbol or RFID transponder encoding defined by the corresponding instream foreign object. Commercially available XSLFO processors do not "know" how to process such instream foreign objects representing barcode symbols and RFID transponders, and thus are not able to produce or render barcode symbols or encode RFID transponders. Commercially available XSLFO processors may, however, render text in an acceptable manner and may even render certain types of instream foreign objects.

If a particular node does not contain an instream foreign object, meaning that it may contain, for example, text data, then this node may be processed in a "standard" way by utilizing the processing power of the XSLFO processor 78 rather than the rendering engine 80, as illustrated in a block 154. In one embodiment, the non-instream foreign object is provided "back" to the XSLFO processor 78, or the XSLFO processor is notified that a particular node in the XSLFO area node tree 140 is suitable for processing by it.

Processing of a node in the XSLFO area node tree 140 containing a non-instream foreign object may be processed by the XSLFO processor 78, as described above. Of course, different commercially available XSLFO processors render text, for example, into different formats. For example, the XSLFO processor referred to as "XSL Formatter" available from Antenna House Corporation, as described above, renders a node into a WINDOWS "device-independent bitmap" format. The XSLFO processor referred to as "XEP" available from RenderX Corporation, as described above, renders a node into "PDF" format, and the XSLFO processor referred to as "FOP" available from the Apache Software Foundation, as described above, may also render a node into "PDF" format.

Preferably, the XML system 10 utilizes the "FOP" XSLFO processor 78 available from the Apache Software Foundation because this XSLFO processor may be configured to "call" a subroutine or other processing function when it encounters an instream foreign object that it is not capable of processing. In particular, this XSLFO processor 78 may be set to call the rendering engine software block 80 described herein, to handle the instream foreign object that it is not capable of processing.

Next, as shown in a block 160, if the node contains an instream foreign object representing a barcode or RFID transponder, which is not capable of being processed by the XSLFO processor 78, the rendering engine 80 checks to determine if the instream foreign object has a "namespace" specific to this XML system 10. For example, the rendering engine 80 may check to determine if the namespace associated with the instream foreign object corresponds to the "Zebra corporation namespace." The namespace notation is known in the art. This is shown in line 3 of the code segment 4 as "xmlns:bo="http://www.zebra.com/2002/XSUBarcode">" Thus, as shown in the code segment 4, the namespace defined above is applied to any elements having a "bo" prefix. Such elements having a "bo" prefix are then only available for processing by the rendering engine 80, which "bo" prefix type elements correspond to a barcode-type instream foreign object. The XSLFO processor 78 will not "know" how to process such elements.

If the instream foreign object is not associated with the proper namespace, it is passed back to the XSLFO processor 78, assuming that it is not a barcode type instream foreign object because the XSLFO processor may be able to process some limited number of instream foreign objects. This is shown by arrow 162 from the block 160 to the block 154.

Generally, however, instream foreign objects exist or are created for the specific reason that the data associated with an instream foreign object is very unique in nature (such as a barcode), and thus, many commercially available or general purpose XSLFO processors can not process them.

Note that the commercially available XSLFO processors mentioned herein are not necessarily incapable of processing all instream foreign objects. They are, however, incapable of processing instream foreign objects corresponding to barcode symbols and RFID encoding.

Assuming that instream foreign object has the appropriate namespace, a block 170 interprets the elements in the instream foreign object to determine barcode type. For example, the instream foreign object is shown at lines 21-26 the code segment 4. More specifically, the barcode element having a prefix of "bo," indicating the correct namespace corresponding to a barcode, is shown to have a barcode type of "postnet," as shown in line 23-24 of the code segment 4, which appears as <bo:postnet interpretation-line="none">08540</bo:postnet>. Note that lines 41-42 of the code segment 4 show a similar barcode element for another instream foreign object, namely, the next barcode label to be printed, which corresponds to the address of "Steven Hawking" shown in code segment 1.

Any barcode type may be specified in the instream foreign object depending upon the application. The barcode type is based upon known barcode standards. For example, the barcode type is not limited to a postnet type of barcode symbol, and may be, for example, Industrial 2 of 5," "PDF 417," "UPC," and the like. The barcode "type" specifies the basic structure of the barcode symbol to be printed, such as the thickness of the bars, the ratio of the thickness of the bars to the width of the space between bars, and the like. Each specific known barcode standard is concretely defined.

Next, after the barcode type has been ascertained from the instream foreign object, the attributes of the instream foreign object are interpreted to determine the barcode characteristics, as shown in a block 176. The characteristics may modify the way in which the barcode symbol is created. For example, one attribute of the "postnet" type barcode may be seen at lines 23-24 of the code segment 4 as "interpretation-line="none"" As is known in the art, "interpretation-line="none"" means that no corresponding human readable text is generated along with the specific barcode symbol. Another example of an attribute associated with the barcode element may be the height of the barcode symbol, which may also be specified in the instream foreign object as an attribute.

Using the barcode type and the attributes obtained from the instream foreign object, the rendering engine 80 then obtains the actual node text data to be converted into the barcode symbol, as shown in a block 180. In this example, the actual barcode data is the zip code "08540," as is shown between reverse angled brackets (>80540<) in line 24 of the code segment 4. The physical conversion from the numerical data "80540" into the bitmap representing the lines or bars of the barcode symbol (for a linear barcode, for example) may be performed by software routines contained in, for example, the barcode label printers commercially available from Zebra Corporation. Such suitable barcode printers may be models Xi series barcode printers (90XiIII Plus, 96XiIII Plus, 140XiIII Plus, 170XiIII Plus, 220XiIII Plus, etc.), the 2800 Series barcode printers, model Z4M, Z6M, 105SL barcode printers, and the like. Such software routines or "native algorithms" contained in barcode printers commercially available from Zebra Corporation are very efficient, and thus the barcodes are rendered quickly.

Once the bitmap representing the barcode symbol has been generated by the block 180, that bitmap is then placed into or merged with the "master" or "label" bitmap 184, which label bitmap represents the image of the entire shipping label, as shown in a block 182. The shipping label contains the human readable text, other text or characters, and the barcode symbol. Note that the aforementioned bitmaps may be separate, i.e., bitmaps for text and a bitmap for the barcode symbol, or one master bitmap may be used or "populated" as processing progresses. In that regard, note that the tree or data structure upon which the rendering engine 80 operates is referred to as the "XSLFO area node tree," meaning that it contains different "areas." Such areas may correspond to different or individual bitmaps or bitmap portions. However, any number of suitable bitmap structures may be used. The exact structure or configuration of the bitmap, or the number of bitmaps is not relevant to the scope of the present invention.

For example, the XSLFO processor 78 when generating text, may place "its" text in one particular bitmap. Such text may correspond to the name "Albert Einstein" discussed above. Because this text will also be printed on the shipping label along with the barcode symbol, the "master" or "label" bitmap 184 will contain all of the component bitmaps. The final "master" bitmap 184 is then sent to the printer driver 54 (FIG. 1) so that the shipping label may be printed.

Figure 5:
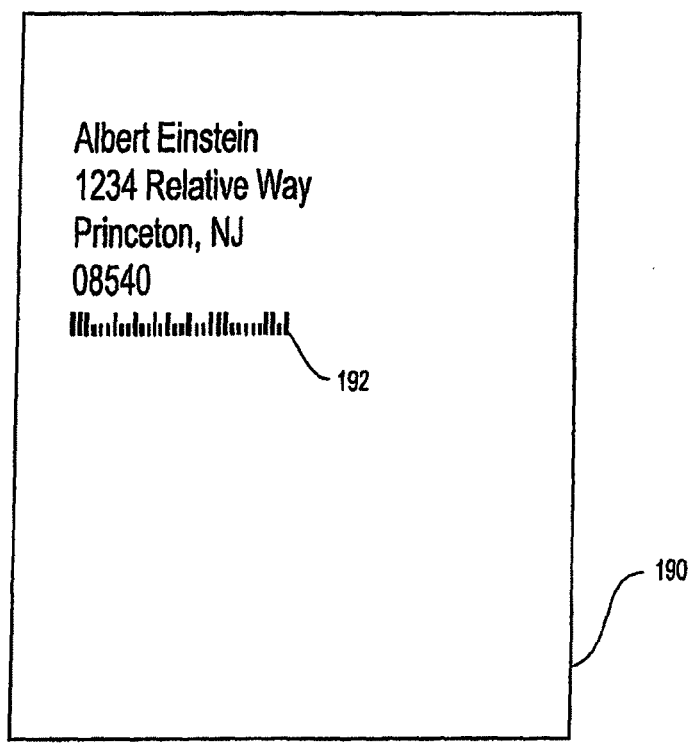
FIG. 5 is a specific representation of a barcode label produced in accordance with the XML system of FIGS. 1-4.

Turning now to FIGS. 4-5, FIG. 5 is a representation 190 of the final output of the above-described processing for the first barcode shipping label specified in code segment 1. The text data is rendered and formatted in accordance with the corresponding stylesheet, while the zip code 192 is also rendered in the form of a barcode symbol by the rendering engine 80, as described above. Note that for purposes of illustration only, the font size or font type shown in FIG. 5 may not be the same as that specified in the corresponding stylesheet shown in the code segment 3.

Referring back to block 170, assuming that the instream foreign object has the appropriate namespace, if the instream foreign object is not a barcode type, then block 170 interprets the elements in the instream foreign object to determine if it is an RFID type. Just like any barcode type may be specified in the instream foreign object, as set forth above, any RFD transponder type may be specified in the instream foreign object as well, depending upon the application. The RFID transponder type is based upon known RFID standards. For example, the RFID type is not limited to an ISO 15693 type of RFID encoding, and may be, for example, a Tag-it or I•Code type of RFID encoding, and the like. The RFID type specifies the basic structure of the RFID data to be encoded, such as the data storage capacity, data addressing scheme, transmit frequency, receive frequency, proprietary features such as serial numbering and data locking, and the like. Each specific known RFID standard is concretely defined, as set forth above.

Next, after it has been determined that the instream foreign object is an RFID type, the attributes of the instream foreign object are interpreted to determine the RFID transponder characteristics, as shown in a block 183. The characteristics may modify the way in which the RFID transponder is encoded, such as which block to write, whether to write-protect (lock) the block, whether to re-try write failures, positioning of the tag under the transceiver antenna during programming, and the like.

Using the RFID transponder type and the attributes obtained from the instream foreign object, the rendering engine 80 then obtains the actual node text data to be converted into the RFID transponder encoding, as shown in a block 185. For example, the actual RFID encoding may be the zip code "08540," which may be placed as ASCII characters in blocks 0 and 1 of a Tag-it transponder (since each block of a Tag-it holds 4 bytes of data). A Tag-it transponder can hold 8 blocks each with 4 bytes of data for a total of 32 bytes of user data. The physical conversion from the numerical data representing the actual REID encoded data into the form suitable for encoding into the RFID transponder may be performed by software routines contained in, for example, the printers and systems commercially available from Zebra Corporation.

For example, several barcode printer/encoders may be used, such as Model R-140 and Model R402, and the like. Such software routines or "native algorithms" contained in systems commercially available from Zebra Corporation are very efficient, and thus the barcodes and RFID transponder encoding are rendered quickly.

Once the RFID transponder encoding has been generated by the block 185, an RFID-specific data structure is rendered, as shown in a block 187. This block renders the RFID-specific data structure to the RFID transponder using the native RFID printer algorithms, as described above, to control the RFID transceiver 61 (FIG. 1) to read and encode the RFID transponder 62 (FIG. 2). This essentially "programs" the RFD transponder, much in the same way as a programmable memory device is programmed.

Figure 6:
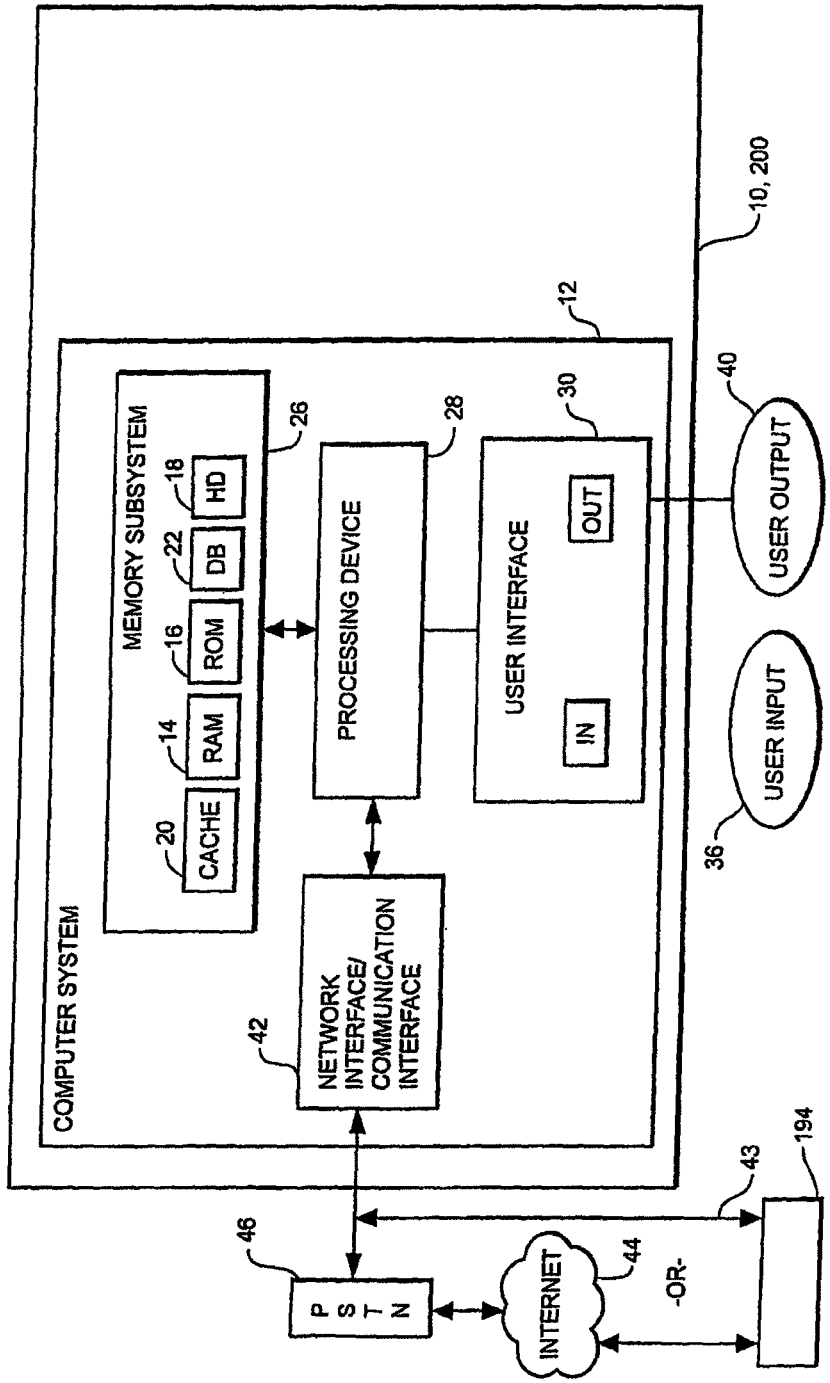
FIG. 6 is a specific example of an alternate embodiment of an XML system configured as a barcode and/or RFD rendering server.

Referring now to FIG. 6, an alternate embodiment is shown. Like reference numbers are used to denote like structures. In this specific embodiment, the XML system 10 need not include or specifically utilize the XML printer apparatus in all instances. In this embodiment, for example, an external requestor 194 may desire to have an XML input data stream rendered into a bitmap so that it can print the barcode label, which may be done remotely. Alternately, the external requestor 194 may request that an RFID transponder be encoded. Accordingly, the external requestor 194 may send a request to the XML server 200 over the Internet or other network 43, 44. The request may be in the same form as the XML input data stream described above with respect to FIGS. 1-3 and code segments 1-4. The request may also be in the form of a protocol that contains XML data, such as SOAP (Simple Object Access Protocol) as is known in the art.

In response, the computer system 12 of the XML server 200 may process the XML input data stream. All of the same processing functions described above are carried out in this embodiment, except that with respect to barcodes and the like, the bitmap is not sent to the printer driver. Rather, the bitmap is converted to any suitable format, such as "JPEG" or "PNG" format, as is known in the art. The JPEG or PNG file is then sent back to the external requestor 194, who then formats the JPEG or PNG file for the appropriate printer driver, and prints and/or displays the barcode label. With respect to RFID transponders, the encoded data may be sent back to the requestor in the form of a data file. Any suitable form or format of data file may be used. Accordingly, the present invention may function as a barcode rendering server and/or an RFID rendering server, and need not necessarily directly perform the printing or encoding functions. Alternatively, the output representation of the data, may be in Scalable Vector Graphic format (SVG), which format is defined by appropriate industry standards.

Specific embodiments of an XML system according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents That which is claimed:

1. An apparatus comprising:
one or more processors configured to implement an XML processor module, wherein being configured to implement the XML processor module includes being configured to:
receive an XML data stream; and
process the XML data stream based at least in part on a stylesheet, wherein the stylesheet includes an extensible stylesheet language formatting object (XSLFO) for formatting data within the XML data stream;
wherein the one or more processors are further configured to generate encoding information based on the processed XML data stream for transmission to the RFID device.

2. The apparatus of claim 1, wherein the stylesheet further includes an RFID-type instream foreign object defining communication with an RFID apparatus.

3. The apparatus of claim 1, wherein the stylesheet further includes extensible stylesheet language transformation (XSLT) instructions for transforming the data in the XML data stream.

4. The apparatus of claim 1, wherein the stylesheet is contained in the XML data stream or the stylesheet is retrieved from a stylesheet repository based upon content of the XML data stream.

5. The apparatus of claim 1, wherein the one more processors being configured to implement the XML processor module include being configured to obtain a schema identified in the XML data stream, the schema being defined to facilitate validation of a portion of the XML data stream.

6. The apparatus of claim 1, wherein the one or more processors are further configured to validate at least a portion of the XML data according to a Document Type Definition (DTD).

7. The apparatus of claim 1, wherein the XML processor module is a SAX processor module.

8. A method comprising:
implementing an XML processor module, wherein implementing the XML processor module includes:
receiving an XML data stream; and
processing, by one or more processors, the XML data stream based at least in part on a stylesheet, wherein the stylesheet includes an extensible stylesheet language formatting object (XSLFO) for formatting data within the XML data stream;
wherein the method further comprises generating encoding information based on the processed XML data stream for transmission to the RFID device.

9. The method of claim 8 wherein the stylesheet further includes an RFID-type instream foreign object defining communication with an RFID apparatus.

10. The method of claim 8, wherein the stylesheet further includes extensible stylesheet language transformation (XSLT) instructions for transforming the data in the XML data stream.

11. The method of claim 8, wherein the stylesheet is contained in the XML data stream or the stylesheet is retrieved from a stylesheet repository based upon content of the XML data stream.

12. The method of claim 8, wherein implementing the XML processor module includes obtaining a schema identified in the XML data stream, the schema being defined to facilitate validation of a portion of the XML data stream.

13. The method of claim 8 further comprising validating at least a portion of the XML data according to a Document Type Definition (DTD).

14. The method of claim 8, wherein the XML processor module is a SAX processor module.

15. A non-transitory computer-readable medium having computer readable program code stored thereon, the program code being configured to, when executed, cause an apparatus to at least:
implement an XML processor module, wherein the program code configured to cause the apparatus to implement the XML processing module includes being configured to cause the apparatus to:
receive an XML data stream; and
process the XML data stream based at least in part on a stylesheet, wherein the stylesheet includes an extensible stylesheet language formatting object (XSLFO) for formatting data within the XML data stream;
wherein the program code is further configured to cause the apparatus to generate encoding information based on the processed XML data stream for transmission to the RFID device.

16. The computer-readable medium of claim 15, wherein the stylesheet further includes an RFID-type instream foreign object defining communication with an RFID apparatus.

17. The computer-readable medium of claim 15, wherein the stylesheet further includes extensible stylesheet language transformation (XSLT) instructions for transforming the data in the XML data stream.

18. The computer-readable medium of claim 15, wherein the stylesheet is contained in the XML data stream or the stylesheet is retrieved from a stylesheet repository based upon content of the XML data stream.

19. The computer-readable medium of claim 15, wherein the program code configured to cause the apparatus to implement the XML processor module includes being configured cause the apparatus to obtain a schema identified in the XML data stream, the schema being defined to facilitate validation of a portion of the XML data stream.

20. The computer-readable medium of claim 15, wherein the one or more processors are further configured to validate at least a portion of the XML data according to a Document Type Definition (DTD).

21. The computer-readable medium of claim 15, wherein the XML processor module is a SAX processor module.

* * * * *